US008772686B2

(12) United States Patent
Louie et al.

(10) Patent No.: US 8,772,686 B2
(45) Date of Patent: Jul. 8, 2014

(54) SHIELDING SYSTEM FOR MICROWAVE OVENS AND MICROWAVE OVEN USING THIS SHIELDING SYSTEM

(75) Inventors: Wai Hang Louie, Hong Kong (HK); Lai Kwork Wah, Hong Kong (HK); Leo Liao, Shen Zhen (CN); Daniel Wan, Hong Kong (HK); Nordh Erik Ulf, Norrkoping (SE)

(73) Assignee: Whirlpool Corporation, Benton Harbor, MI (US)

( * ) Notice: Subject to any disclaimer, the term of this patent is extended or adjusted under 35 U.S.C. 154(b) by 1222 days.

(21) Appl. No.: 12/166,368

(22) Filed: Jul. 2, 2008

(65) Prior Publication Data

US 2009/0008386 A1 Jan. 8, 2009

(30) Foreign Application Priority Data

Jul. 3, 2007 (EP) .................................... 07111628

(51) Int. Cl.
*H05B 6/64* (2006.01)
*H05B 6/12* (2006.01)
*B32B 5/12* (2006.01)

(52) U.S. Cl.
USPC ............................ 219/756; 219/680; 428/105

(58) Field of Classification Search
USPC ................. 219/756, 729, 738–741, 680, 685; 126/21 A, 200, 198; 174/381, 382, 389, 174/35 MS, 35 R, 35 GC
See application file for complete search history.

(56) References Cited

U.S. PATENT DOCUMENTS

| | | | | |
|---|---|---|---|---|
| 2,888,543 | A | 5/1959 | Haagensen | |
| 5,300,746 | A | 4/1994 | Walters et al. | |
| 5,698,125 | A * | 12/1997 | Kwon | 219/680 |
| 6,680,092 | B1 | 1/2004 | Levy | |
| 6,828,534 | B2 * | 12/2004 | Leutner et al. | 219/740 |

FOREIGN PATENT DOCUMENTS

| | | | |
|---|---|---|---|
| EP | 464390 | A2 | 1/1992 |
| FR | 2484397 | | 12/1981 |
| GB | 2262208 | | 6/1993 |
| JP | 54146174 | | 11/1979 |
| JP | 58127404 | A * | 7/1983 |
| JP | 2005/175335 | | 6/2005 |

* cited by examiner

*Primary Examiner* — Quang Van

(57) ABSTRACT

A shielding system for microwave ovens includes a first layer of parallel grounded conductors and a second layer of parallel grounded conductors substantially perpendicular to the conductors of the first layer and, for high frequency, electrically insulated therefrom, each layer presenting a plurality of parallel metal wires connected at one end and grounded.

14 Claims, 1 Drawing Sheet

SHIELDING SYSTEM FOR MICROWAVE OVENS AND MICROWAVE OVEN USING THIS SHIELDING SYSTEM

BACKGROUND OF THE INVENTION

1. Field of the Invention

The present invention relates to a shielding system for microwave ovens. It is well known in the art of microwave ovens the need of providing shielding systems, particularly in connection with glass in the oven door, which shall allow the user to look into the cooking cavity of the oven without any leakage of microwaves through the transparent door.

2. Description of the Related Art

There are also other uses of microwave shielding systems, particularly for microwave ovens having an electromagnetic induction coil provided outside the cooking cavity, adjacent the bottom wall thereof. Such an oven is disclosed by EP-A-464390. In this type of ovens the shielding system must act as a reflective boundary for microwaves (typically in the range of 2.45 GHz) and be substantially "transparent" to the electromagnetic waves (typically about 20 to 30 kHz) responsible for induction heating. Moreover, large losses in the shielding system due to eddy current loss in the surface portion of the shielding system is preferably avoided. In the above application the use of a non-magnetic metal mesh within a predetermined size range as microwave shielding system solved the above technical problem.

This known system is not completely satisfactory from an energy loss point of view. As a matter of fact the mesh is heated both by microwave absorption and by electromagnetic induction. In a connected mesh, microwave losses can be rather substantial due to the fact that it is possible to have a multitude of different resonant pathways in the connected mesh. Such heating causes a deformation and therefore such deformation has to be absorbed by one or more insulating layers on which the mesh is placed.

SUMMARY OF THE INVENTION

One aspect of the present invention is to provide a shielding system that does not present the above disadvantages and that has a low cost.

Another aspect of the present invention is to provide a shielding device that enables induction cooking inside a microwave oven by stopping microwave leakage from the cavity and letting lower frequency induction field passing through into the cavity to achieve both microwave and induction cooking within the same unit of cavity.

The above aspects are reached thanks to a shielding system and to a microwave oven having the features listed in the appended claims.

The applicant has discovered that by using a shielding system comprising two layers of perpendicular parallel metal conductors insulated from each other and grounded, the results in term of microwave shielding and/or loss due to eddy currents are surprisingly good. Each layer comprises a plurality of parallel metal wires, connected at one end and grounded (like a fork). These two layers of wires are perpendicular, where with this term we mean that the wire are disposed at an angle equal or close to 90°. Other values of angle between the wires can be used, these being considered within the scope of the invention, but an angle of or close to 90° is shown.

The insulation between the two layers can be obtained by placing them at a certain low distance, for instance between 1 and 2 mm. This configuration, in which the shielding structure of parallel wires has to present a sufficient stiffness, allows airflow through the shielding system, e.g. for forced convection system or cavity ventilation. This would avoid the use of small holes and perforations that block microwave leakage and allow airflow through. The solution according to the invention means a significant reduction of the resistance for the airflow.

According to another embodiment of the invention, the two metal wire layers are supported by the two surfaces of a transparent sheet, for instance of glass or polymeric material. In order to increase microwave leakage attenuation, an auxiliary transparent sheet of glass can be used, having a conductive and optically transparent coating (e.g. heat reflecting glass). This embodiment provides an excellent "see through" window for a microwave oven. Moreover the transparent support sheet may be thinner than the support layer used according to prior art, since the heating of metal wires according to the invention is reduced.

According to a further embodiment of the invention, a two-side printed circuit board (PCB) can be used to build up the two metal wire layers. In this embodiment the plurality of parallel conductors are obtained as conductive pathways or traces etched from copper sheets laminated onto each face of the PCB etching the pathways on the two sides in a perpendicular fashion. According to this embodiment the connection of conductors to the ground is made easier and a distributed connection to ground can be achieved.

BRIEF DESCRIPTION OF THE DRAWINGS

Further advantages and features according to the present invention will be clear from the following detailed description, provided by way of a non-limiting example, with reference to the attached drawings in which.

DETAILED DESCRIPTION OF THE PREFERRED EMBODIMENTS

Figure 1:
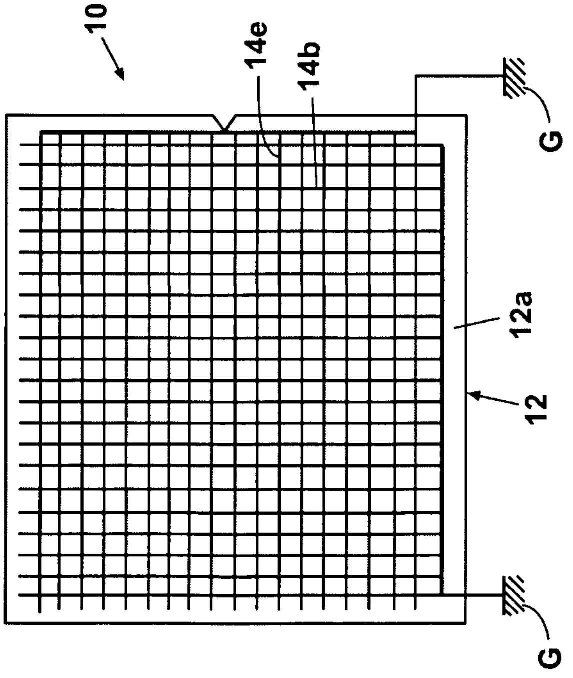
FIG. 1 is a schematic frontal view of a shielding device according to the present invention.
Figure 2:
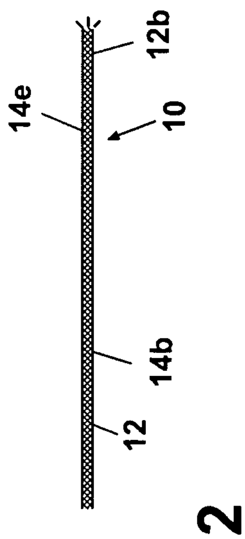
FIG. 2 is a cross section of the device of FIG. 1.

With reference to the drawings, with 10 is indicated a shielding device comprising a transparent glass sheet 12, preferably 1-2 mm thick, having two opposite faces 12*a* and 12*b*. On such faces are supported two comb-shaped layers 14*a* and 14*b* each constituted by a plurality of metal parallel wires electrically connected to ground G. The metal wires, for instance made of copper, have a diameter between 0.2 and 2 mm. The distance between each two adjacent wire is between 1 and 4 mm. The metal wires of the layer 14*a* placed on face 12*a* are perpendicular to the metal wires of the layer 14*b* placed on face 12*b* of the glass sheet. Therefore by looking through the glass sheet 12, as in FIG. 1, there seems to be an echelon-shaped crossing of metal wires, while the glass sheet acts as an electric insulator. When the shielding device 10 is installed in a microwave oven, for instance to the microwave oven door, the device shall be attached to the cavity in a known fashion to block microwave leakage at the edge of the device, e.g. by galvanic contact, capacitive sealing or quarter-wavelength choke. In the embodiment where a two-side printed circuit board is used, a distributed circumferential ground contact is used as well.

Figure 3:
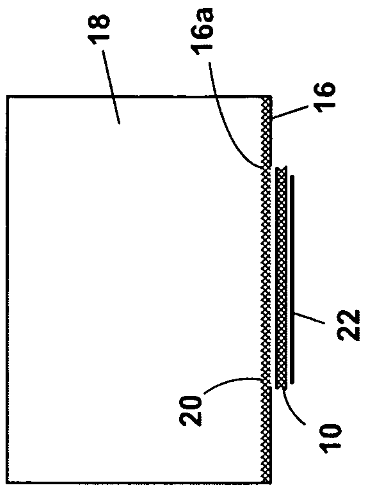
FIG. 3 is a schematic sectional view of a microwave oven according to the invention in which the shielding device of FIG. 1-2 is used in association with an electromagnetic induction coil.

In FIG. 3 it is shown a particular use of the shielding device 10 in connection with the bottom wall 16 of a microwave oven cavity 18. The bottom wall 16 presents a circular central hole 16*a* and a glass plate 20 covers it. Below the bottom wall, coaxial with the hole 16*a* it is placed the shielding device 10 that is above and adjacent an induction cooker coil 22. Therefore there is no leakage of microwaves through the bottom wall 16 despite the presence of the hole 16*a*, while there is negligible dissipation of energy and therefore negligible heating of the device 10 by means of eddy currents when the induction cooker coil 22 is being operated.

We claim:

1. A shielding system for microwave ovens comprising:

a first comb-shaped layer of parallel grounded conductors, the parallel grounded conductors being connected together, by a first conductor, only at one end of the first layer; and a second comb-shaped layer of parallel grounded conductors, the parallel grounded conductors being connected together, by a second conductor, only at one end of the second layer, wherein:

the parallel grounded conductors of the second layer are substantially perpendicular to the parallel grounded conductors of the first layer, and the conductors of the second layer are electrically insulated from the conductors of the first layer.

2. The shielding system according to claim 1, wherein:

each layer presents a plurality of parallel, grounded metal wires.

3. The shielding system according to claim 1, wherein:

the conductors of each layer are placed on opposite sides of an insulating plate.

4. A shielding system for microwave ovens comprising:

a first layer of parallel grounded conductors, the parallel grounded conductors being connected together, by a first conductor, only at one end of the first layer; and a second layer of parallel grounded conductors, the parallel grounded conductors being connected together, by a second conductor, only at one end of the second layer, wherein:

the parallel grounded conductors of the second layer are substantially perpendicular to the parallel grounded conductors of the first layer, the conductors of the second layer are electrically insulated from the conductors of the first layer, the conductors of each layer are placed on opposite sides of an insulating plate, and the conductors of each layer are built as traces of a two-side printed circuit board.

5. The shielding system according to claim 1, wherein:

the conductors of the first layer and the conductors of the second layer are electrically insulated for high frequency.

6. A microwave oven comprising:

a cooking cavity;

a shielding system provided at one or more walls of the cooking cavity, said shielding system including:

a first comb-shaped layer of parallel grounded conductors, the parallel grounded conductors being connected together, by a first conductor, only at one end of the first layer; and a second comb-shaped layer of parallel grounded conductors, the parallel grounded conductors being connected together, by a second conductor, only at one end of the second layer, wherein:

the parallel grounded conductors of the second layer are substantially perpendicular to the parallel grounded conductors of the first layer, and the conductors of the second layer are electrically insulated from the conductors of the first layer.

7. The microwave oven according to claim 6, further comprising:

a transparent door for the cooking cavity, wherein the shielding system is provided on the transparent door of the oven.

8. The microwave oven according to claim 6, further comprising:

an electromagnetic induction coil positioned outside the cooking cavity adjacent a bottom wall of the cooking cavity, wherein the shielding system is provided at an aperture in the bottom wall of the cooking cavity.

9. The microwave oven according to claim 6, wherein:

each layer presents a plurality of parallel metal wires connected only at one end and grounded.

10. The microwave oven according to claim 6, wherein:

the conductors of each layer are placed on opposite sides of an insulating plate.

11. The microwave oven according to claim 10, wherein:

the conductors of each layer are built as traces of a two-side printed circuit board.

12. The microwave oven according to claim 10, wherein:

the insulating plate is transparent to electromagnetic waves.

13. The microwave oven according to claim 6, wherein:

the conductors of the first layer and the conductors of the second layer are electrically insulated for high frequency.

14. The shielding system according to claim 3, wherein:

the insulating plate is transparent to electromagnetic waves.

* * * * *